Feb. 19, 1929.

L. L. EDWARDS

ROTARY PUMP

Filed March 22, 1927

Inventor
L. L. EDWARDS,

Attorney

Patented Feb. 19, 1929.

1,702,338

UNITED STATES PATENT OFFICE.

LEONARD L. EDWARDS, OF LONGVIEW, WASHINGTON.

ROTARY PUMP.

Application filed March 22, 1927. Serial No. 177,390.

This invention relates to an improvement in rotary pumps wherein the pump action is perfectly balanced through the utilization of intermeshing drive gears at each end of each pump rotor shaft, with the balancing gears operating in a casing adapted to contain lubricant.

The primary object of the present invention is to utilize the pressure created in the pump proper as a means for exerting a pressure upon the oil in the gear casings to thereby prevent any tendency toward leakage of the oil or lubricant through the packing between the gear casings and pump casing.

The invention is illustrated in the accompanying drawings, in which.

Figure 1:
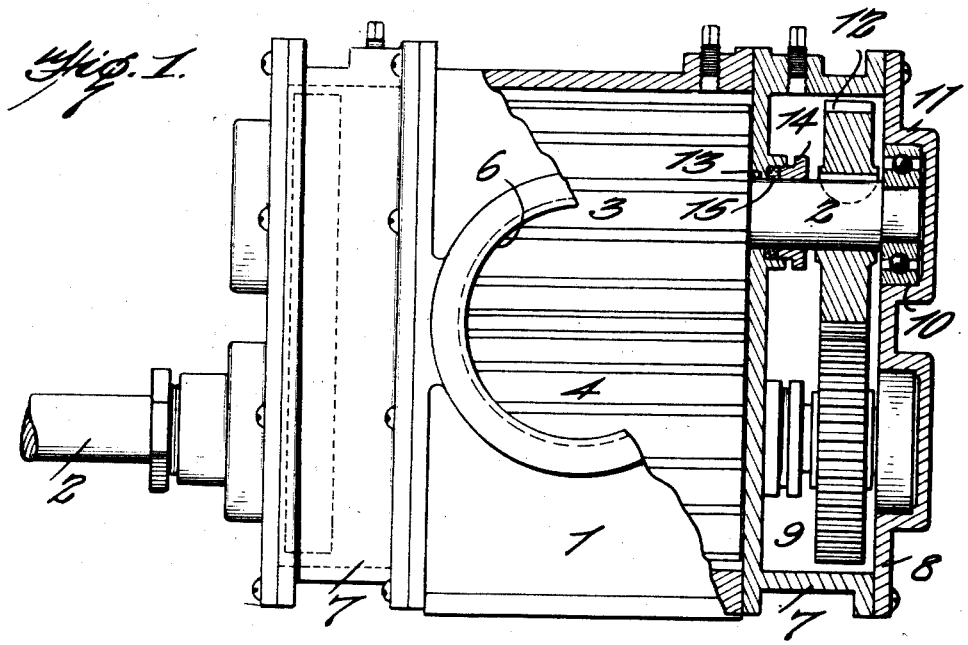
Figure 1 is a view in elevation, partly in section, of the improved rotary pump.
Figure 2:
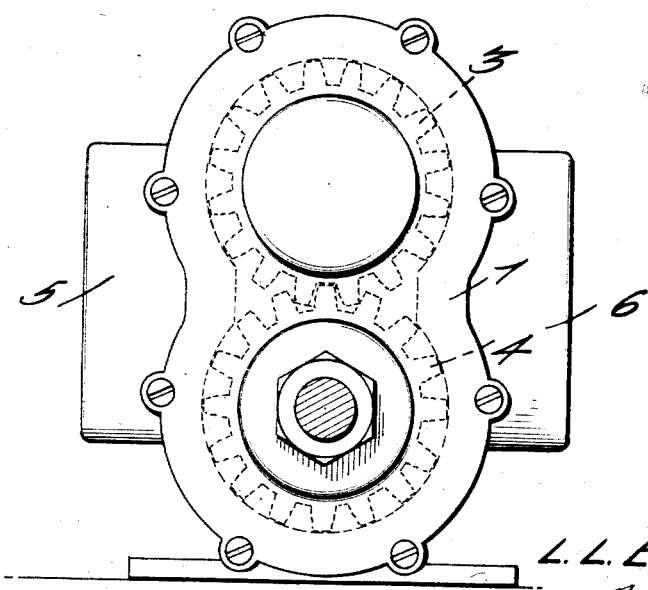
Figure 2 is an end elevation of the same.

The improved pump comprises a casing 1 in which, through the medium of shafts 2, are mounted the interfitting pump rotors 3 and 4 by which the fluid admitted through inlet 5 is delivered under pressure through outlet 6.

The pump casing 1 is formed at each end with an integral extension 7 having a removable cover 8, whereby to provide at each end of the pump casing what may be hereinafter termed an oil casing 9. The shafts 2 extend into the respective oil casings and are terminally mounted in ball bearings 10 held within offsets 11 in the respective covers 8, one of the shafts being extended through the cover as a power shaft.

The respective shafts in each oil casing are provided with intermeshing gears 12 keyed on such shafts, so that in action the driving strain of the pump rotors is absorbed by the gears and as the gears are disposed beyond the rotors in both directions, the action of the pump is balanced.

The rotor shafts 2 pass through openings 13 in those walls of the pump casing which constitute the inner walls of the oil casings, and these openings are provided with a simple type of packing gland 14 and packing 15. The packing and gland so employed are sufficient to maintain a sealing against leakage of the lubricant into the pump casing when the parts are at rest, for it will be apparent that when the pump is operating, the pressure within the pump casing automatically created by the head or resistance offered the pump develops a pressure on the oil within the oil casings so that in effect the pressure exerted on the packing is neutralized and there is no tendency, therefore, toward leakage of the lubricant into the pump casing.

This arrangement, therefore, avoids the necessity of tightening the packing to an extent to take care of this additional pressure and thus materially reduces the friction of operation and insures a greater efficiency and output from the pump than would be possible under other conditions.

It has been found by actual experiment that a pump operated under the conditions of actual use has maintained the lubricant in the casing substantially intact and it has not been found necessary to replace any of such lubricant during such period.

What I claim to be new is:

A rotary pump having a pumping cylinder and opposed lubricant cylinders at the respective ends of the pumping cylinder, shafts extending throughout the pumping cylinder and lubricant cylinders and rotatably supported in the latter, co-operating pump rotors on said shafts within the pumping cylinder, intermeshing gears on said shafts within each of the lubricant cylinders, and packing for each shaft between the pumping cylinder and each lubricant cylinder, the packing having such frictional cooperation with the shaft as will tend to prevent the flow of lubricant past the packing when the parts are in a state of rest, this comparatively loose relation of the packing avoiding excessive friction on the shafts the parts being so constructed and arranged as to utilize the pressure generated in the pump cylinder to balance the pressure of the lubricant in the lubricant cylinders and thereby prevent flow of the lubricant to the pump cylinder independently of the packing during operation.

In testimony whereof I affix my signature.

LEONARD L. EDWARDS. [L. S.]